J. B. GREELY.
Corn-Planter.
No. 36,753.  Patented Oct. 21, 1862.
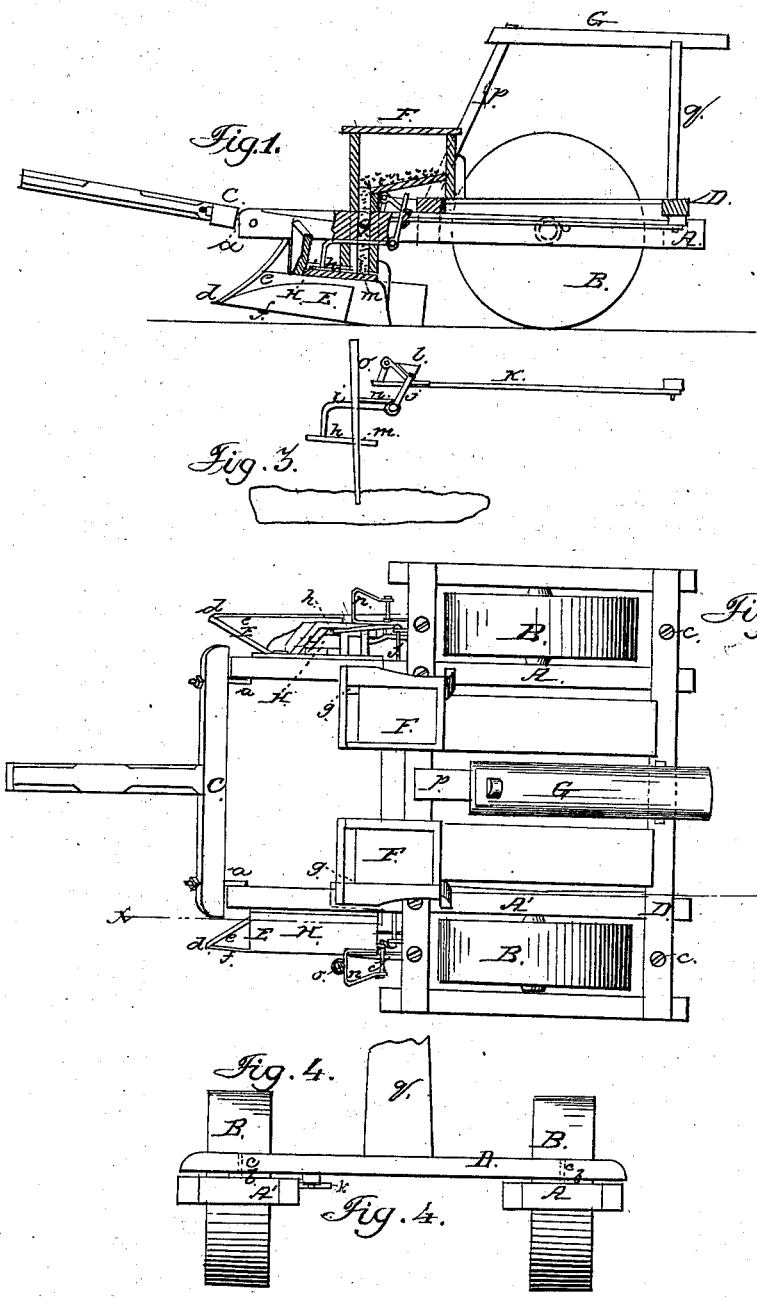

UNITED STATES PATENT OFFICE.

JOSIAH B. GREELY, OF SUMMIT, IOWA, ASSIGNOR TO HIMSELF AND B. T. LATHAM, OF DAYTON, OHIO.

IMPROVEMENT IN CORN-PLANTERS.

Specification forming part of Letters Patent No. 36,753, dated October 21, 1862.

*To all whom it may concern:*

Be it known that I, JOSIAH B. GREELY, of Summit, in the county of Muscatine and State of Iowa, have invented a new and Improved Corn-Planter; and I do hereby declare that the following is a full, clear, and exact description of the same, reference being had to the accompanying drawings, forming a part of this specification, in which—

Figure 1 represents a longitudinal vertical section of my invention, the line $x\,x$, Fig. 2, indicating the plane of section. Fig. 2 is a plan or top view of the same. Fig. 3 is a detached elevation of the devices for dropping the corn and marking the ground. Fig. 4 is a rear elevation of the frame.

Similar letters of reference in the several views indicate corresponding parts.

To enable those skilled in the art to make and use my invention, I will proceed to describe it with reference to the drawings.

The two frames A A', which from the bearings for the covering-wheels B B', are connected in front by a cross-bar, C, which is fastened to the ends of the longitudinal timbers of the frames A A by hooks or eyebolts $a$, or by any other desirable means, and in the rear by a cross-bar, D, which rests on springs or spring-pads $b$, being retained in its place by screws $c$, so that each of the wheels can rise and fall a certain distance without affecting the other wheel, and that if either wheel runs into a low place the runner or furrow-opener on the opposite side is not thrown out of the ground. By this arrangement it is also very easy to take the frame-work apart and set it to different widths of rows. The front parts of the frames A A' rest on the furrow-openers E, which are provided with points $d$, which are intended to run a very little under the ground, so that stalks that lie on or near the top of the ground will be raised up and thrown on one side; and in order to throw such stalks off toward the outside the upper edges of the furrow-openers form inclined planes $e$ in such a manner that by their action all the stalks or roots thrown up by the points $d$ are carried over and deposited on the outside of the machine. The lower or cutting edge, $f$, of the furrow-openers runs downward from the point, and all the stalks or roots met on the ground will be either forced down or cut off. By giving this shape to the furrow-opener I have obviated the difficulty generally experienced with runners made to run over all. Such runners work badly in sticky ground, as the stalks that lie loosely at or near the top of the ground will be pushed along by the runner and make so large a mark that the wheel cannot cover the corn, thereby causing very bad work and frequent stopping to clear the runners.

The frames A A' support the seed-boxes F and the driver's seat G. The seed-boxes communicate through channels $g$ with the distributing-chambers H, which are situated over the runners or furrow-openers, and from which the seed is discharged by notched slides $n$. These slides are connected by rods $i$ with a double crank-shaft, $j$, and a stout flat spring, $k$, acts on a triangular bearing, $l$, which occupies the central portions of the crank-shaft $j$. By the action of this spring the crank-shaft $j$ is held in such a position that the notches $m$ in the seed-slides are inside the distributing-chambers H, and no seed is permitted to escape; but if by some external power the slides are pushed back the spring $k$ will return the same to their original position as soon as the power which has been exerted to push them out ceases.

The seed-slides are operated by means of trippers $n$, that are hinged to the ends of the crank-shaft $j$; and by a stake or pole, $o$, which is in the hands of the person sitting on the cover of the seed-boxes F. In order to handle this stake to advantage, the ground is first marked one way in the usual manner before commencing with the planter. On passing over the field the dropper (or person sitting on the seed-boxes) places his stake into each previously-made mark as he comes to them, and lets it remain until it is struck by one of the trippers $n$, and as the planter moves on the crank-shaft with the seed-slides is thrown back, and the seed collected in the notches $m$ is deposited on the ground behind the furrow-openers and into the furrows opened by them. As soon as the seed is deposited the dropper raises his stake, and the tripper is so hung that it turns up and permits the seed-slide to return instantaneously to its original position, ready for the next hill. The spring $k$ is so arranged that the same can easily be turned over when it becomes set one way, which is of particular advantage with springs made of wood, (the usual material in the interior of the country.) The driver occupies the seat G, which rests on two standards, p q, and it is so constructed that it easily plays, so as not to interfere with the working of the planter.

One side of the frame can be taken off and used to plant one row at a time, when desired, ordinary plow-handles being applied to guide the planter.

Having thus fully described my invention, what I claim as new, and desire to secure by Letters Patent, is—

1. Operating the seeding mechanism by means of an independent pole or stake, o, placed in the ground by the operator in advance of the seeding mechanism at the point where the seed is to be dropped, so that as the machine moves along the seeding mechanism, or some part thereof, will come in contact with the said stake and cause the seed to be instantly dropped at that point, all substantially in the manner herein shown and described.

2. The combination, with the seed-slides h, of the hinged stake strikers or trippers n, rods i, crank-shaft j, and spring k, in the manner herein shown and described.

3. The laterally-standing inclined face e, projecting point d, and inclined cutting-edge f on the furrow-openers E, as and for the purposes set forth.

4. The combination of the spring-pads b with the frames A A' and cross-bars C D, in the manner and for the purpose herein shown and described.

JOSIAH B. GREELY.

Witnesses:
 JOSEPH LAMBERT,
 E. H. PAGE.